(12) United States Patent
Li et al.

(10) Patent No.: US 11,619,752 B2
(45) Date of Patent: Apr. 4, 2023

(54) CZT SEMICONDUCTOR ACTIVITY METER AND ACTIVITY MEASURING DEVICE

(71) Applicant: SHANXI MEDICAL UNIVERSITY, Shanxi (CN)

(72) Inventors: Sijin Li, Shanxi (CN); Haiyan Liu, Shanxi (CN); Gangqiang Zha, Shanxi (CN)

(73) Assignee: SHANXI MEDICAL UNIVERSITY, Shanxi (CN)

( * ) Notice: Subject to any disclaimer, the term of this patent is extended or adjusted under 35 U.S.C. 154(b) by 144 days.

(21) Appl. No.: 17/421,683

(22) PCT Filed: Jan. 10, 2019

(86) PCT No.: PCT/CN2019/071089
§ 371 (c)(1),
(2) Date: Jul. 8, 2021

(87) PCT Pub. No.: WO2020/142972
PCT Pub. Date: Jul. 16, 2020

(65) Prior Publication Data
US 2022/0099849 A1 Mar. 31, 2022

(30) Foreign Application Priority Data
Jan. 8, 2019 (CN) .......................... 201910017203.4

(51) Int. Cl.
*G01T 1/24* (2006.01)

(52) U.S. Cl.
CPC .................................. *G01T 1/242* (2013.01)

(58) Field of Classification Search
CPC .................................................... G01T 1/242
See application file for complete search history.

(56) References Cited

U.S. PATENT DOCUMENTS 5,245,191 A * 9/1993 Barber .................... G01T 1/295
250/363.04
10,162,066 B2 12/2018 Fu et al.
(Continued)

FOREIGN PATENT DOCUMENTS

CN 102439482 A 5/2012
CN 102540270 A 7/2012
(Continued)

OTHER PUBLICATIONS

First search of priority document of CN201910017203.4 dated May 19, 2019.
(Continued)

*Primary Examiner* — Hugh Maupin
(74) *Attorney, Agent, or Firm* — IP & T Group LLP

(57) ABSTRACT

Provided is a CZT semiconductor activity meter and an activity measuring device, which relate to the field of medical apparatus and instruments. The CZT semiconductor activity meter includes a shell, a CZT probe, a package substrate and a processing module, wherein the CZT probe is arranged on an end of the shell, the package substrate is arranged at the middle part of the shell and abuts against an inner wall of the shell, the CZT probe is connected to one side of the package substrate, the other side of the package substrate and the inner wall of the shell together form a package inner cavity, and the processing module is accommodated in the package inner cavity and connected to the package substrate. The CZT semiconductor activity meter has a small volume, is convenient to operate, does not require manual control during detection, and can be used at room temperature.

20 Claims, 3 Drawing Sheets

(56) References Cited

U.S. PATENT DOCUMENTS

2009/0242776 A1    10/2009   Kobashi et al.
2013/0124103 A1    5/2013   Mabie et al.
2018/0236267 A1    8/2018   Kuang et al.

FOREIGN PATENT DOCUMENTS

| | | |
|---|---|---|
| CN | 102939120 A | 2/2013 |
| CN | 103037933 A | 4/2013 |
| CN | 103163548 A | 6/2013 |
| CN | 103364818 A | 10/2013 |
| CN | 103852475 A | 6/2014 |
| CN | 106547017 A | 3/2017 |
| CN | 108241167 A | 7/2018 |
| EP | 1989572 A1 | 11/2008 |

OTHER PUBLICATIONS

Notification to Grant Patent Right for Invention of priority document of CN201910017203.4 dated Aug. 13, 2019.
First Office Action of priority document of CN201910017203.4 dated May 27, 2019.
Supplementary search of priority document of CN201910017203.4 dated Aug. 13, 2019.

* cited by examiner

CZT SEMICONDUCTOR ACTIVITY METER AND ACTIVITY MEASURING DEVICE

CROSS-REFERENCE TO RELATED APPLICATIONS

This application is a national stage application of PCT/CN2019/071089 filed on Jan. 10, 2019, which claims priority to Chinese Patent Application No. 201910017203.4, filed with the Chinese Patent Office on Jan. 8, 2019, entitled "CZT Semiconductor Activity Meter and Activity Measuring Device", which is incorporated herein by reference in its entirety.

TECHNICAL FIELD

The present disclosure relates to the field of medical instruments and, in particular, to a CZT semiconductor activity meter and an activity measuring device.

BACKGROUND ART

With the development of nuclear technology and the continuous improvement of the medical level in China, nuclear medicine has been widely used as a new branch of science for diagnosis, treatment, and research of diseases using nuclear technology and is applicable to examination of the functions of almost all tissues, organs, or systems. The nuclear medicine, which has been developed with the development of radioisotopes and the application of nuclear technology in the field of biology, has now become an important part of modern medicine.

A radionuclide activity meter is an important instrument indispensable in the actual measurement of the activity of radiopharmaceuticals to be administered to subjects or patients in a nuclear medicine department of a hospital. However, most of the activity meters in current hospitals are imported products, and almost all of such measuring devices employ ionization chambers. Therefore, such activity meters or measuring devices are generally large and bulky in size, which is not conducive to development of portable devices. Furthermore, such activity meters are in current operating mode, information on energy of incident rays cannot be obtained, and therefore such activity meters cannot identify nuclides and should be controlled manually to switch the measurement level when measuring different types of radiopharmaceuticals. In contrast, newly-developed CZT (CdZnTe, cadmium zinc telluride) semiconductor detectors are characterized by, for example, being operable at room temperature, having higher atomic number and density, achieving high detection efficiency with a smaller size, and providing high energy linearity and high energy resolution, thus a CZT-based activity meter is a more ideal detection material.

Although CZT is a more ideal detection material for activity meters, there is no device for detecting the activity of radiopharmaceuticals using CZT crystals in the prior art, because it is limited by techniques for growth and preparation of CZT materials, and very weak signals are generated by X/γ-rays in CZT semiconductor detectors and are susceptible to factors such as external interference.

In view of this, it is particularly important to design and manufacture a CZT semiconductor activity meter which detects the activity of radiopharmaceuticals using CZT crystals, has a small size, is easily operable, does not require manual control during detection, and can be used at room temperature.

SUMMARY

An object of the present disclosure includes providing a CZT semiconductor activity meter which detects the activity of radiopharmaceuticals using CZT crystals, has a small size, is easily operable, does not require manual control during detection, and can be used at room temperature.

Another object of the present disclosure includes providing an activity measuring device which detects the activity of radiopharmaceuticals using CZT crystals, has a small size, is easily operable, does not require manual control during detection, and can be used at room temperature.

The technical solutions adopted in the present disclosure include the following technical solutions.

A CZT semiconductor activity meter includes a shell, a CZT probe, a package substrate, and a processing module, wherein the CZT probe is arranged at one end of the shell, the package substrate is arranged at a middle part of the shell and abuts against an inner wall of the shell, the CZT probe is connected to one side of the package substrate, an inner package cavity is formed by the other side of the package substrate together with the inner wall of the shell, and the processing module is accommodated in the inner package cavity and connected to the package substrate; the CZT probe includes a first slab crystal, a second slab crystal, and a guiding and connecting crystal, the first slab crystal is connected to one end of the package substrate and extends in a direction away from the package substrate, the second slab crystal is connected to the other end of the package substrate and extends in a direction away from the package substrate, the first slab crystal and the second slab crystal are arranged oppositely in parallel to each other and form a photon capturing cavity, the guiding and connecting crystal is arranged inside the photon capturing cavity and is attached to a surface of the package substrate, and the first slab crystal, the guiding and connecting crystal, and the second slab crystal are connected in sequence and form a U-shaped structure; the guiding and connecting crystal includes a CZT crystal layer, a metal layer, and a protective layer, the CZT crystal layer is deposited on the surface of the package substrate, the protective layer is deposited on a surface of a side of the CZT crystal layer away from the package substrate, the metal layer is arranged between the CZT crystal layer and the protective layer, a plurality of heat-dissipating through holes are provided in a sidewall of the CZT crystal layer, the plurality of heat-dissipating through holes are arranged close to the metal layer and the plurality of heat-dissipating through holes are arranged in parallel, and each of the heat-dissipating through holes extends through the CZT crystal layer.

Further, an insulating film layer is arranged between the metal layer and the CZT crystal layer to insulate the metal layer and the CZT crystal layer from each other.

Further, a metal in the metal layer includes gold and is implanted between the protective layer and the CZT crystal layer using a metal ion source implantation method.

Further, the CZT crystal layer has a thickness of 0.5 to 10 mm.

Further, the protective layer includes an aluminum oxide layer.

Further, the CZT probe further includes a biasing device, and the biasing device is connected to the metal layer by means of a gold wire and is configured to supply a voltage to the metal layer.

Further, first metal grids are laid on both opposite surfaces of the first slab crystal and the second slab crystal, and the first metal grids on both sides are electrically connected to the metal layer.

Further, a first heat dissipation substrate is arranged on a surface of a side of the first slab crystal away from the second slab crystal, and a second heat dissipation substrate is arranged on a surface of a side of the second slab crystal away from the first slab crystal.

Further, the first heat dissipation substrate and the second heat dissipation substrate each include a graphene layer.

Further, heat-dissipating through holes are provided in each of the sidewalls of the CZT crystal layer, and the plurality of heat-dissipating through holes are staggered and communicated with each other inside the CZT crystal layer.

Further, the plurality of heat-dissipating through holes are all located on a heat dissipation plane parallel to the upper surface of the CZT crystal layer, and there is a distance of 0.8 mm between the heat dissipation plane and the upper surface of the CZT crystal layer.

Further, the CZT probe further includes a third slab crystal and a fourth slab crystal, the third slab crystal and the fourth slab crystal are arranged oppositely on two sides of the guiding and connecting crystal, and the photon capturing cavity which is in the shape of a cuboid is formed by the first slab crystal, the second slab crystal, the third slab crystal, and the fourth slab crystal.

Further, second metal grids are laid on both opposite surfaces of the third slab crystal and the fourth slab crystal, and the second metal grids are electrically connected to the metal layer.

Further, the shell is arranged to cover the first slab crystal and the second slab crystal, and an end portion of the shell is recessed inward and forms an inwardly recessed end which extends into the photon capturing cavity and is arranged close to the guiding and connecting crystal, so that the end portion of the shell has a contour attaching to the first slab crystal and the second slab crystal.

Further, the shape of the end surface of the inwardly recessed end is consistent with the shape of the guiding and connecting crystal, and the end surface of the inwardly recessed end covers the upper side of the guiding and connecting crystal.

Further, the shell is arranged to cover the photon capturing cavity, and an end portion of the shell is provided with a collection opening opposite to the guiding and connecting crystal.

Further, an end cover is arranged on the collection opening, one end of the end cover is hinged to an edge of one side of the shell, and the other end of the end cover is detachably connected to an edge of the other side of the shell to selectively shield the collection opening.

Further, a rotating shaft is arranged at one end of the end cover, a rotating lug is arranged at an edge of one side of the shell, and the rotating shaft is hinged to the rotating lug.

Further, the end cover is provided with a buckling piece at its end away from the rotating shaft, the shell is provided with a clamping groove in an edge of its side away from the rotating lug, and the buckling piece is matched with the clamping groove.

Further, a plurality of coupling channels are provided in the middle part of the package substrate, each coupling channel extends through the package substrate, the CZT probe is coupled to one ends of the plurality of coupling channels, and the processing module is coupled to the other ends of the plurality of coupling channels.

Further, the processing module includes a charge-sensitive amplifier and a back-end processing unit, wherein the charge-sensitive amplifier is coupled to the ends of the coupling channels away from the CZT probe and is configured to collect charges and generate an electrical signal, and the back-end processing unit is connected to the output terminal of the charge-sensitive amplifier.

Further, the back-end processing unit includes a main amplifying circuit, an analysis circuit, and an ADC processing circuit, wherein the main amplifying circuit is connected to the output terminal of the charge-sensitive amplifier and configured to amplify the electrical signal, the analysis circuit is connected to the main amplifying circuit and configured to analyze the electrical signal and obtain energy of incident rays, and the ADC processing circuit is connected to the analysis circuit and configured to obtain incident ray intensity information based on the energy of incident rays.

Further, the processing module further includes a comparison unit, calibration activity data is set in the comparison unit, and the comparison unit is connected to the ADC processing circuit and configured to acquire activity information based on the incident ray intensity information.

Further, the shell is provided with a data interface, and the data interface extends into the shell and is connected to the comparison unit.

Further, the package substrate includes a ceramic board or an epoxy resin board.

An activity measuring device includes a fixed support, a multi-channel analyzer, and a CZT semiconductor activity meter. The CZT semiconductor activity meter includes a shell, a CZT probe, a package substrate, and a processing module, wherein the CZT probe is arranged at one end of the shell, the package substrate is arranged at a middle part of the shell and abuts against an inner wall of the shell, the CZT probe is connected to one side of the package substrate, an inner package cavity is formed by the other side of the package substrate together with the inner wall of the shell, and the processing module is accommodated in the inner package cavity and connected to the package substrate. The shell is connected to the fixed support, and the multi-channel analyzer is connected to the processing module.

Further, the fixed support includes a base and a carrying frame, the carrying frame is provided with a drug placement tray and an activity meter fixing rod, the drug placement tray is configured for placement of radiopharmaceuticals, the shell is fixedly connected to the activity meter fixing rod, and the shell is opposed to the drug placement tray at its end close to the CZT probe.

Further, the activity measuring device further includes an isolation box, and the isolation box is detachably connected to the base and is arranged to cover the carrying frame so that both the radiopharmaceuticals and the shell are accommodated in the isolation box to be isolated.

Further, a sliding groove is provided in the base, and both ends of the bottom of the isolation box extend into the sliding groove and can slide along the sliding groove.

Further, the isolation box is made of lead, and the box body of the isolation box has a thickness between 3 mm and 10 mm.

The present disclosure has the following advantageous effects.

A CZT semiconductor activity meter according to the present disclosure has a CZT probe arranged at one end of the shell and detects X/γ-rays using the CZT probe, instead of an original ionization chamber for detection, so that the CZT semiconductor activity meter has a greatly reduced size and can be conveniently carried. Furthermore, the measurement with the CZT semiconductor activity meter is implemented by generating an electrical signal by directly using the interaction of X/γ-rays with CZT crystals, and the amplitude of the electrical signal is proportional to the energy of the incident rays, whereby information on the energy of X/γ-rays can be detected, and the type and activity of the nuclide can be determined based on the energy information, without manual switching control, which is very convenient. Moreover, the CZT semiconductor activity meter is operable at room temperature due to the characteristics of the CZT crystals. Compared with the prior art, the CZT semiconductor activity meter according to the present disclosure has a small size, is easily operable, does not require manual control during detection, and can be used at room temperature.

In a CZT semiconductor activity meter according to the present disclosure, a first slab crystal is connected to one end of a package substrate and extends in a direction away from the package substrate and a second slab crystal is connected to the other end of the package substrate and extends in a direction away from the package substrate, and the first slab crystal and the second slab crystal are arranged oppositely in parallel to each other and form a photon capturing cavity, and a guiding and connecting crystal is arranged inside the photon capturing cavity and is attached to a surface of the package substrate. Photons incident from X/γ-rays can be maximally captured in the photon capturing cavity formed by the first slab crystal and the second slab crystal, and the incident photons directly hit the guiding and connecting crystal, so that the X/γ-rays can fully react with CZT crystals to enhance the intensity of the generated electrical signal. Moreover, external interference can be reduced by providing the photon capturing cavity.

A CZT semiconductor activity meter according to the present disclosure has a CZT crystal layer deposited on a surface of a package substrate, a protective layer deposited on a surface of a side of the CZT crystal layer away from the package substrate, and a metal layer arranged between the CZT crystal layer and the protective layer. An insulating film layer is arranged between the metal layer and the CZT crystal layer to insulate the metal layer and the CZT crystal layer from each other. The surfaces of the metal layer and the CZT crystal layer can be protected by providing the protective layer. The metal layer forms an electrode when in use to form an electric field inside the CZT crystals. Moreover, electric leakage can be maximally prevented, while preventing conduction between the metal layer and the CZT crystal layer, by providing the insulating film layer.

A CZT semiconductor activity meter according to the present disclosure has a plurality of heat-dissipating through holes provided in a sidewall of the CZT crystal layer. The plurality of heat-dissipating through holes are arranged close to the metal layer, the plurality of heat-dissipating through holes are arranged in parallel, and each of the heat-dissipating through holes extends through the CZT crystal layer. Heat generated by the metal layer can be dissipated to a great extent by providing the heat-dissipating through holes, thereby avoiding accumulation of the heat on the CZT crystal layer so as to ensure the safety of the CZT crystal layer and increase its service life.

BRIEF DESCRIPTION OF THE DRAWINGS

In order to more clearly illustrate the technical solutions of embodiments of the present disclosure, drawings required for use in the embodiments will be described briefly below.

It is to be understood that the drawings below are merely illustrative of some embodiments of the present disclosure, and therefore should not be considered as limiting its scope. It will be understood by those of ordinary skill in the art that other relevant drawings can also be obtained from these drawings without any inventive effort.

REFERENCE NUMERALS

Figure 1:
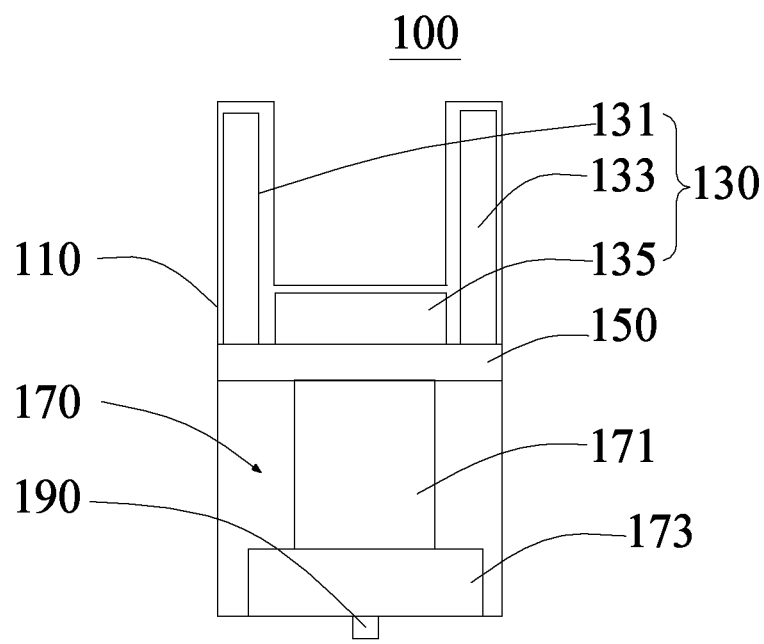
FIG. 1 is a schematic structural diagram of a CZT semiconductor activity meter according to an embodiment of the present disclosure.

100: CZT semiconductor activity meter; 110: shell; 111: collection opening; 113: end cover; 115: rotation shaft; 117: buckling piece; 130: CZT probe; 131: first slab crystal; 1311: first heat dissipation substrate; 133: second slab crystal; 1331: second heat dissipation substrate; 134: first metal grid; 135: guiding and connecting crystal; 1351: CZT crystal layer; 1353: metal layer; 1355: protective layer; 1357: insulating film layer; 1359: heat-dissipating through hole; 137: third slab crystal; 139: fourth slab crystal; 150: package substrate; 170: processing module; 171: charge-sensitive amplifier; 173: back-end processing unit; 190: data interface; 200: activity measuring device; 210: fixed support; 211: base; 213: carrying frame; 230: multi-channel analyzer; 250: isolation box.

DETAILED DESCRIPTION OF THE EMBODIMENTS

In order to further clarify the objects, technical solutions, and advantages of the embodiments of the present disclosure, the technical solutions of the embodiments of the present disclosure will be described below clearly and completely with reference to the drawings of the embodiments of the present disclosure. It is apparent that the embodiments to be described are some, but not all of the embodiments of the present disclosure. Generally, the components of the embodiments of the present disclosure, as described and illustrated in the figures herein, may be arranged and designed in a wide variety of different configurations.

Thus, the following detailed description of the embodiments of the present disclosure, as represented in the figures, is not intended to limit the scope of the present disclosure as claimed, but is merely representative of selected embodiments of the present disclosure. All the other embodiments obtained by those of ordinary skill in the art in light of the embodiments of the present disclosure without inventive efforts will fall within the scope of the present disclosure as claimed.

It should be noted that similar reference numerals and letters refer to similar items in the following figures, and thus once a certain item is defined in one figure, it may not be further defined or explained in the following figures.

In the description of the present disclosure, it should be noted that the terms such as "center", "up", "vertical", "horizontal", "inside", and "outside" indicate the orientation or positional relationships shown based on the figures, or the orientation or positional relationships in which the inventive product is conventionally placed in use, and these terms are intended only to facilitate the description of the present disclosure and simplify the description, but not intended to indicate or imply that the referred devices or elements must be in a particular orientation or constructed or operated in the particular orientation, and therefore should not be construed as limiting the present disclosure. In addition, terms such as "first" and "second" are used for distinguishing the description only, and should not be understood as an indication or implication of relative importance.

In the description of the present disclosure, it should also be noted that terms "arrange", "couple", "mount", and "connect" should be understood in a broad sense unless otherwise expressly specified or defined. For example, connection may be fixed connection or detachable connection or integral connection, may be mechanical connection or electric connection, or may be direct coupling or indirect coupling via an intermediate medium or internal communication between two elements. The specific meanings of the above-mentioned terms in the present disclosure can be understood by those of ordinary skill in the art according to specific situations.

Some embodiments of the present disclosure will be described in detail below with reference to the accompanying drawings. The features in the following embodiments may be combined with each other in the case of no conflict.

In an optional embodiment of the present disclosure, referring to FIG. 1, the present embodiment provides a CZT semiconductor activity meter 100 configured to detect the activity of radiopharmaceuticals. The CZT semiconductor activity meter 100 includes a shell (or housing) 110, a CZT probe 130, a package substrate 150, and a processing module 170. The CZT probe 130 is arranged at one end of the shell 110. The package substrate 150 is arranged at the middle part of the shell 110 and abuts against the inner wall of the shell 110. The CZT probe 130 is connected to one side of the package substrate 150. An inner package cavity is formed by the other side of the package substrate 150 together with the inner wall of the shell 110. The processing module 170 is accommodated in the inner package cavity and connected to the package substrate 150.

Activity, also called a decay rate, refers to the number of atoms of a sample that decay per unit time. The activity of a radiopharmaceutical in the present disclosure refers to the number of atoms of a radioactive element or isotope in the radiopharmaceutical that decay per unit time.

The processing module 170 includes a charge-sensitive amplifier 171, a back-end processing unit 173, and a comparison unit. The charge-sensitive amplifier 171 is coupled to an end of a coupling channel away from the CZT probe 130 and is configured to collect charges and generate an electrical signal. The back-end processing unit 173 is connected to the output terminal of the charge-sensitive amplifier 171. Calibration activity data is set in the comparison unit, and the comparison unit is connected to an ADC processing circuit and configured to acquire activity information based on incident ray intensity information (information on intensity of incident rays).

It should be noted that the calibration activity data set in the comparison unit in the present embodiment is derived from data on the relationship between incident ray intensity and activity calibrated in the China Institute of Metrology and is input into the comparison unit in advance, so that the activity of the pharmaceutical can be acquired directly based on the incident ray intensity information.

The back-end processing unit 173 includes a main amplifying circuit, an analysis circuit, and an ADC processing circuit. The main amplifying circuit is connected to the output terminal of the charge-sensitive amplifier 171 and configured to amplify the electrical signal. The analysis circuit is connected to the main amplifying circuit and configured to analyze the electrical signal and obtain energy of incident rays. The ADC processing circuit is connected to the analysis circuit and configured to obtain incident ray intensity information based on the energy of incident rays. Preferably, the ADC processing circuit is an electrical analog-to-digital conversion circuit used in data acquisition and is operated based on a specific principle consistent with that of a prior art ADC processing circuit, and therefore will not be described any further here.

It is worth noting that the CZT (CdZnTe) mentioned in the present embodiment is short for cadmium zinc telluride, and CZT crystals are wide-bandgap II-VI compound semiconductors, which are widely used as epitaxial substrates for infrared detectors, room-temperature nuclear radiation detectors, and so on. The CZT probe 130 mentioned in the present embodiment is a probe formed based on a CZT crystal.

In the present embodiment, the shell 110 is provided with a data interface 190, and the data interface 190 extends into the shell 110 and is connected to the comparison unit. Preferably, the data interface 190 may be a USB interface, or may, of course, be any other type of interface such as a 484 or 232 interface, and is not specifically limited herein. The data interface 190 is connected to an external device such as a secondary analysis instrument or a computer, by which the nature of the incident rays can be further analyzed and provided in the form of data for reference by the staff.

The CZT probe 130 includes a first slab crystal 131, a second slab crystal 133, a guiding and connecting crystal 135, and a biasing device (not shown in the figure). The first slab crystal 131 is connected to one end of the package substrate 150 and extends in a direction away from the package substrate 150, the second slab crystal 133 is connected to the other end of the package substrate 150 and extends in a direction away from the package substrate 150, and the first slab crystal 131 and the second slab crystal 133 are arranged oppositely in parallel to each other and form a photon capturing cavity. The guiding and connecting crystal 135 is arranged inside the photon capturing cavity and is attached to a surface of the package substrate 150. The biasing device is connected to the guiding and connecting crystal 135, the first slab crystal 131, and the second slab crystal 133 by means of gold wires and is configured to supply a voltage.

In the present embodiment, the biasing device may supply power alone or together with the back-end processing module 170. This is not specifically limited here, as long as a voltage can be supplied to the first slab crystal 131, the second slab crystal 133, and the guiding and connecting crystal 135.

In the present embodiment, the first slab crystal 131 and the second slab crystal 133 are also made of CZT crystals, and they are arranged in parallel and form a photon capturing cavity, in which photons incident from X/γ-rays can be captured maximally. Moreover, the incident photons directly hit the guiding and connecting crystal 135, so that the X/γ-rays can fully react with CZT crystals to enhance the intensity of the generated electrical signal. Moreover, external interference can be reduced by providing the photon capturing cavity.

In the present embodiment, a plurality of coupling channels (not shown in the figure) are provided in the middle part of the package substrate 150. Each coupling channel extends through the package substrate 150. The CZT probe 130 is coupled to one ends of the plurality of coupling channels, and the processing module 170 is coupled to the other ends of the plurality of coupling channels.

In the present embodiment, the package substrate 150 includes a ceramic board or an epoxy resin board. Preferably, the package substrate 150 is a ceramic board. The package substrate 150 described above is not specifically limited in the embodiments of the present disclosure.

In the present embodiment, the shell 110 is arranged to cover the first slab crystal 131 and the second slab crystal 133, and an end portion of the shell 110 is recessed inward and forms an inwardly recessed end which extends into the photon capturing cavity and is arranged close to the guiding and connecting crystal 135, so that the end portion of the shell 110 has a contour matching the first slab crystal 131 and the second slab crystal 133. The shape of the end surface of the inwardly recessed end is consistent with the shape of the guiding and connecting crystal 135, and the end surface of the inwardly recessed end covers the upper side of the guiding and connecting crystal 135.

In actual capturing (collecting), when X/γ-rays generated by a radiopharmaceutical enter the photon capturing cavity, they interact with the CZT crystals in the first slab crystal 131, the second slab crystal 133, and the guiding and connecting crystal 135 to generate electron-hole pairs. The electron-hole pairs drift to the two poles under the action of an electric field provided by the biasing device, and are collected by the charge-sensitive amplifier 171 during the drift process to generate an electrical signal. The amplitude of the generated electrical signal is proportional to the energy of the incident rays. The electrical signal is amplified by the main amplifying circuit and then analyzed and collected by the analysis circuit, and the energy of the incident rays can be obtained. The type of the radiopharmaceutical can be calculated based on the energy of the incident rays. Meanwhile, the ADC processing circuit built in the back-end processing unit 173 can obtain information on intensity of the radiopharmaceutical by timed collection. Finally, the activity of the radiopharmaceutical is obtained by comparing with the data in the comparison unit.

Figure 2:
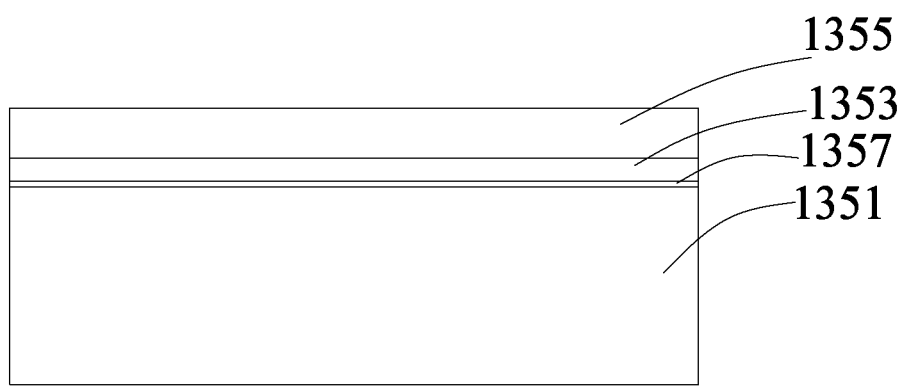
FIG. 2 is a schematic structural diagram of a guiding and connecting crystal in FIG. 1 when viewed from a first perspective.

Referring to FIG. 2, the guiding and connecting crystal 135 includes a CZT crystal layer 1351, a metal layer 1353, and a protective layer 1355. The CZT crystal layer 1351 is deposited on the surface of the package substrate 150. The protective layer 1355 is deposited on a side surface of the CZT crystal layer away from the package substrate 150. The metal layer 1353 is arranged between the CZT crystal layer 1351 and the protective layer 1355. The surfaces of the metal layer 1353 and the CZT crystal layer 1351 can be effectively protected by providing the protective layer 1355. Moreover, the metal layer 1353 is electrically connected to the biasing device and configured to form an electric field inside the CZT crystal.

In the present embodiment, an insulating film layer 1357 is arranged between the metal layer 1353 and the CZT crystal layer 1351 to insulate the metal layer 1353 and the CZT crystal layer 1351 from each other. A leakage current can be reduced and electric leakage can be maximally prevented by providing the insulating film layer 1357.

In the present embodiment, a metal in the metal layer 1353 includes gold and is implanted between the protective layer 1355 and the CZT crystal layer 1351 by using a metal ion source implantation method. Of course, the metal layer 1353 here may be made of other metal materials such as platinum or indium and is not specifically limited here.

In the present embodiment, the protective layer 1355 includes an aluminum oxide layer. The passivated protective layer 1355 can be used to effectively prevent corrosion of the metal layer 1353 or the CZT crystal layer 1351 by foreign matters or oxygen inside the instrument and achieve a good protective effect.

It should be noted that, in the present embodiment, the metal layer 1353 is implanted between the protective layer 1355 and the CZT crystal layer 1351 by using a metal ion source implantation method. Because the CZT crystal has a detection efficiency very sensitive to the surface state when it is used as a probe, ions should not be implanted and also a metal transition layer should not be deposited on the surface, otherwise the crystal boundaries will be communicated with each other and a greater leakage current will be generated. Therefore, in the manufacturing process, it is necessary to first form the insulating film layer 1357, then form the protective layer 1355 on the insulating film layer 1357, and finally implant the metal layer 1353 by using the metal ion source implantation method.

In the present embodiment, the CZT crystal layer 1351 has a thickness of 0.5 to 10 mm, and preferably, the CZT crystal layer 1351 has a thickness of 5 mm. The insulating film layer 1357 has a thickness between 10 nm and 30 nm, and preferably, the insulating film layer 1357 has a thickness of 20 nm. The metal layer 1353 has a thickness between 100 nm and 400 nm, and preferably, the metal layer 1353 has a thickness of 300 nm. The protective layer 1355 has a thickness of 300 nm or more, and preferably, the protective layer 1355 has a thickness of 400 nm. Here, the dimension of each layer inside the CZT probe is merely given as an example and does not mean that its thickness range is only the range listed in the present embodiment.

Figure 3:
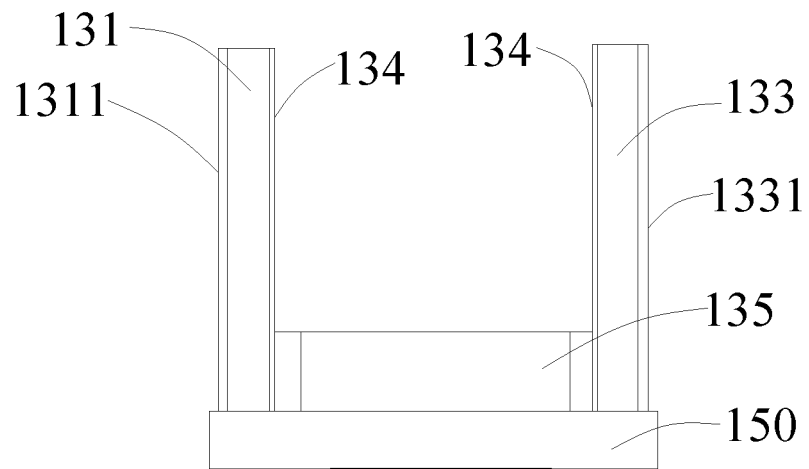
FIG. 3 is a schematic structural diagram of a CZT semiconductor activity meter without a processing module according to an embodiment of the present disclosure.

Referring to FIG. 3, in the present embodiment, first metal grids 134 are laid on both opposite surfaces of the first slab crystal 131 and the second slab crystal 133, and the first metal grids 134 are electrically connected to the metal layer 1353. The problem of heat concentration can be effectively avoided and the service life can be increased by arranging metal grids to replace metal layers 1353. In addition, a first heat dissipation substrate 1311 is arranged on a surface of a side of the first slab crystal 131 away from the second slab crystal 133, and a second heat dissipation substrate 1331 is arranged on a surface of a side of the second slab crystal 133 away from the first slab crystal 131. The heat dissipation effect can be further improved by providing the heat dissipation substrates, thereby ensuring the normal operation of the first slab crystal 131 and the second slab crystal 133.

In the present embodiment, the first heat dissipation substrate 1311 and the second heat dissipation substrate 1331 each include a graphene layer. Of course, the heat dissipation substrates here may also be made of other materials with higher thermal conductivity, such as diamond or polycrystalline silicon nitride or the like, which are not specifically limited here.

Figure 4:
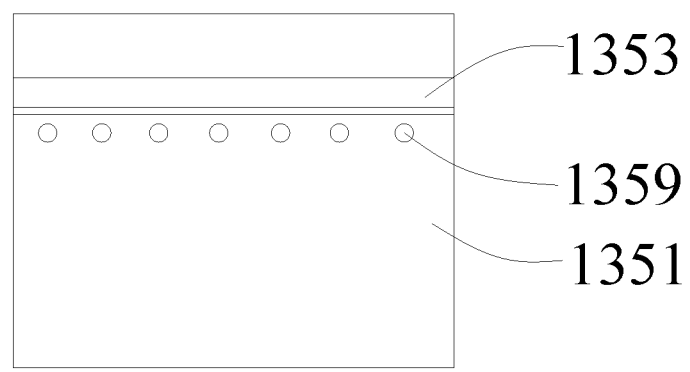
FIG. 4 is a schematic structural diagram of the guiding and connecting crystal in FIG. 1 when viewed from a second perspective.

Referring to FIG. 4, a plurality of heat-dissipating through holes 1359 are provided in a sidewall of the CZT crystal layer 1351, and the plurality of heat-dissipating through holes 1359 are arranged close to the metal layer 1353. Preferably, the plurality of heat-dissipating through holes 1359 are located on the same plane, and each heat-dissipating through hole 1359 has a distance of 0.8 mm from the upper surface of the CZT crystal layer 1351 and thus can be fully exposed to heat generated by the metal layer 1353 and dissipate the heat to the outside. Preferably, each heat-dissipating through hole 1359 has a hole dimeter of 0.1 mm. The above numerical values are merely exemplary and illustrative, and other numerical values may also be used specifically.

In the present embodiment, the plurality of heat-dissipating through holes 1359 are arranged in parallel, and each heat-dissipating through hole 1359 extends through the CZT crystal layer 1351. Here, the heat-dissipating through holes 1359 are distributed in two opposite sidewalls of the CZT crystal layer 1351 and are, of course, not limited to such arrangement. The two adjacent sidewalls of the CZT crystal layer may also be provided with heat-dissipating through holes 1359. After the heat-dissipating through holes 1359 are provided in the peripheral sidewalls of the CZT crystal layer, the heat-dissipating through holes 1359 in the periphery are staggered and communicated with each other in its interior, thereby further increasing the heat dissipation efficiency.

In summary, the present embodiment provides a CZT semiconductor activity meter 100, which detects X/γ-rays using the CZT probe 130, instead of an original ionization chamber for detection, so that the CZT semiconductor activity meter 100 has a greatly reduced size and can be conveniently carried. Furthermore, the measurement with the CZT semiconductor activity meter 100 is implemented by generating an electrical signal by directly using the interaction of X/γ-rays with CZT crystals, and the amplitude of the electrical signal is proportional to the energy of the incident rays, whereby information on the energy of X/γ-rays can be detected, and the type and activity of the nuclide can be determined based on the energy information, without manual switching control, which is very convenient. Moreover, the CZT semiconductor activity meter 100 is operable at room temperature due to the characteristics of the CZT crystals. Compared with the prior art, the CZT semiconductor activity meter 100 according to the present disclosure has a small size, is easily operable, does not require manual control during detection, and can be used at room temperature.

In another optional embodiment of the present disclosure, the present embodiment provides a CZT semiconductor activity meter 100, which has the same basic structure and principle and achieves the same technical effects as that of the first embodiment of the present disclosure. Parts not mentioned in the present embodiment for the sake of brief description may be understood with reference to the corresponding description in the first embodiment. The present embodiment differs from the first embodiment in the CZT probe 130.

Figure 5:
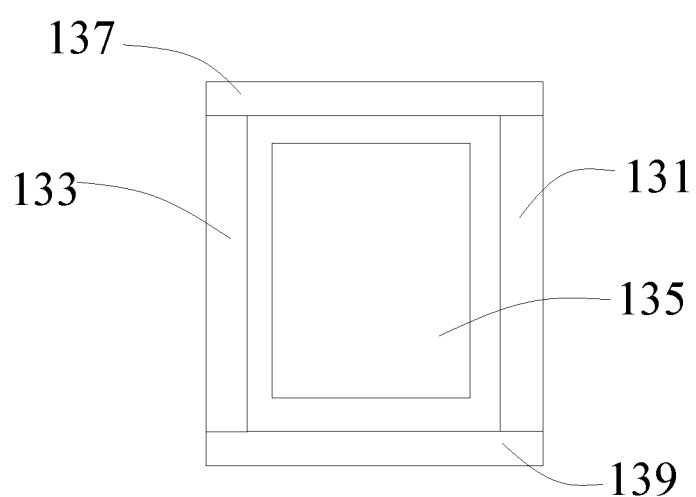
FIG. 5 is a schematic partial structural diagram of another CZT semiconductor activity meter according to an embodiment of the present disclosure.

Referring to FIG. 5, the CZT semiconductor activity meter 100 according to the present embodiment is configured to detect the activity of radiopharmaceuticals. The CZT semiconductor activity meter 100 includes a shell 110, a CZT probe 130, a package substrate 150, and a processing module 170. The CZT probe 130 is arranged at one end of the shell 110. The package substrate 150 is arranged at the middle part of the shell 110 and abuts against the inner wall of the shell 110. The CZT probe 130 is connected to one side of the package substrate 150. An inner package cavity is formed by the other side of the package substrate 150 together with the inner wall of the shell 110. The processing module 170 is accommodated in the inner package cavity and connected to the package substrate 150.

The CZT probe 130 includes a first slab crystal 131, a second slab crystal 133, a third slab crystal 137, a fourth slab crystal 139, a guiding and connecting crystal 135, and a biasing device. The first slab crystal 131 is connected to one end of the package substrate 150 and extends in a direction away from the package substrate 150, the second slab crystal 133 is connected to the other end of the package substrate 150 and extends in a direction away from the package substrate 150, and the first slab crystal 131 and the second slab crystal 133 are arranged oppositely in parallel to each other and form a photon capturing cavity. The guiding and connecting crystal 135 is arranged inside the photon capturing cavity and is attached to a surface of the package substrate 150. The biasing device is connected to the guiding and connecting crystal 135, the first slab crystal 131, and the second slab crystal 133 by means of gold wires and is configured to supply a voltage. The third slab crystal 137 and the fourth slab crystal 139 are arranged oppositely on the two sides of the guiding and connecting crystal 135, and the photon capturing cavity which is in the shape of a cuboid is formed by the first slab crystal 131, the second slab crystal 133, the third slab crystal 137, and the fourth slab crystal 139.

In the present embodiment, the first slab crystal 131, the second slab crystal 133, the third slab crystal 137, and the fourth slab crystal 139 are all made of CZT crystals, wherein the first slab crystal 131 and the second slab crystal 133 are arranged to be opposite and parallel to each other, the third slab crystal 137 and the fourth slab crystal 139 are arranged to be opposite and parallel to each other, and the first slab crystal 131, the second slab crystal 133, the third slab crystal 137, and the fourth slab crystal 139 are connected end to end to form a rectangular photon capturing cavity.

In the present embodiment, first metal grids 134 are laid on both opposite surfaces of the first slab crystal 131 and the second slab crystal 133, and the first metal grids 134 are electrically connected to the metal layer 1353. The problem of heat concentration can be effectively avoided and the service life can be increased by replacing metal layers 1353 with the arranged metal grids.

In the present embodiment, second metal grids are also laid on both opposite surfaces of the third slab crystal 137 and the fourth slab crystal 139, and the second metal grids are electrically connected to the metal layer 1353. The problem of heat concentration can be effectively avoided and the service life can be increased by replacing metal layers 1353 with the arranged metal grids. Moreover, the two first metal grids 134 and the two second metal grids have the same electrical potential to facilitate uniform incidence of X/γ-rays into the photon capturing cavity.

A CZT semiconductor activity meter 100 according to the present embodiment detects X/γ-rays using the CZT probe 130, instead of an original ionization chamber for detection, so that the CZT semiconductor activity meter 100 has a greatly reduced size and can be conveniently carried. Furthermore, the measurement with the CZT semiconductor activity meter 100 is implemented by generating an electrical signal by directly using the interaction of X/γ-rays with CZT crystals, and the amplitude of the electrical signal is proportional to the energy of the incident rays, whereby information on the energy of X/γ-rays can be detected, and the type and activity of the nuclide can be determined based on the energy information, without manual switching control, which is very convenient. Moreover, the CZT semiconductor activity meter 100 is operable at room temperature due to the characteristics of the CZT crystals. Furthermore, the energy of X/γ-rays can be collected maximally by the arranged semi-closed photon capturing cavity so as to improve the detection accuracy.

Figure 6:
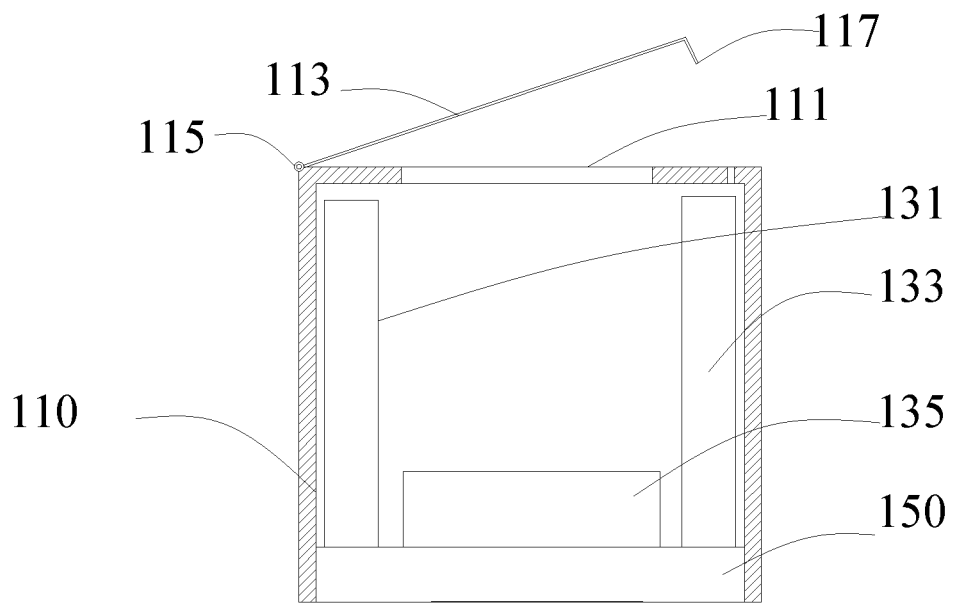
FIG. 6 is a schematic partial structural diagram of yet another CZT semiconductor activity meter according to an embodiment of the present disclosure.

In yet another optional embodiment of the present disclosure, referring to FIG. 6, the present embodiment provides a CZT semiconductor activity meter 100, which has the same basic structure and principle and achieves the same technical effects as that of the first embodiment. Parts not mentioned in the present embodiment for the sake of brief description may be understood with reference to the corresponding description in the first embodiment. The present embodiment differs from the first embodiment in the shell 110.

The CZT semiconductor activity meter 100 according to the present embodiment is configured to detect the activity of radiopharmaceuticals. The CZT semiconductor activity meter 100 includes a shell 110, a CZT probe 130, a package substrate 150, and a processing module 170. The CZT probe 130 is arranged at one end of the shell 110. The package substrate 150 is arranged at the middle part of the shell 110 and abuts against the inner wall of the shell 110. The CZT probe 130 is connected to one side of the package substrate 150. An inner package cavity is formed by the other side of the package substrate 150 together with the inner wall of the shell 110. The processing module 170 is accommodated in the inner package cavity and connected to the package substrate 150.

The CZT probe 130 includes a first slab crystal 131, a second slab crystal 133, a guiding and connecting crystal 135, and a biasing device. The first slab crystal 131 is connected to one end of the package substrate 150 and extends in a direction away from the package substrate 150, the second slab crystal 133 is connected to the other end of the package substrate 150 and extends in a direction away from the package substrate 150, and the first slab crystal 131 and the second slab crystal 133 are arranged oppositely in parallel to each other and form a photon capturing cavity. The guiding and connecting crystal 135 is arranged inside the photon capturing cavity and is attached to a surface of the package substrate 150. The biasing device is connected to the guiding and connecting crystal 135, the first slab crystal 131, and the second slab crystal 133 by means of gold wires and is configured to supply a voltage.

In the present embodiment, the shell 110 is arranged to cover the photon capturing cavity, and an end portion of the shell 110 is provided with a collection opening 111 opposite to the guiding and connecting crystal 135.

An end cover 113 is arranged on the collection opening 111, one end of the end cover 113 is hinged to one side edge of the shell 110, and the other end of the end cover 113 is detachably connected to the other side edge of the shell 110 to selectively shield the collection opening 111.

In the present embodiment, a rotating shaft 115 is arranged at one end of the end cover 113, a rotating rug is arranged on one side edge of the shell 110, and the rotating shaft 115 is hinged to the rotating lug. The end cover 113 is provided with a buckling piece 117 at its end away from the rotating shaft 115, the shell 110 is provided with a clamping groove in its side edge away from the rotating lug, and the buckling piece 117 is matched with the clamping groove. Specifically, the buckling piece 117 is vertically arranged on the edge of the end cover 113 and protrudes downward.

A CZT semiconductor activity meter 100 according to the present embodiment has an end cover 113 arranged at an end portion of the shell 110. When measurement is required, the end cover 113 is opened and the end cover 113 is placed on one side of the shell 110, so that X/γ-rays can be incident on the CZT probe 130 in the shell 110 through the collection opening 111, which facilitates the measurement. When the measurement is completed, the end cover 113 is closed to cover the collection opening 111 and is fixed by using the buckling piece 117, which can avoid entry of foreign matters in the photon capturing cavity during transportation or when not in use.

Figure 7:
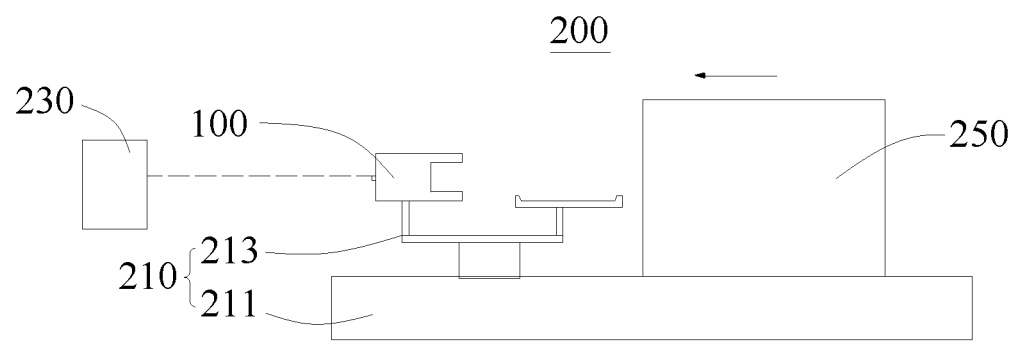
FIG. 7 is a schematic structural diagram of an activity measuring device according to an embodiment of the present disclosure.

In a further optional embodiment of the present disclosure, referring to FIG. 7, the present embodiment provides an activity measuring device 200, which includes a fixed support 210, a multi-channel analyzer 230, an isolation box 250, and a CZT semiconductor activity meter 100, wherein the CZT semiconductor activity meter 100 has the same basic structure and principle and achieves the same technical effects as that of the first embodiment. Parts not mentioned in the present embodiment for the sake of brief description may be understood with reference to the corresponding description in the first embodiment.

The CZT semiconductor activity meter 100 includes a shell 110, a CZT probe 130, a package substrate 150, and a processing module 170. The CZT probe 130 is arranged at one end of the shell 110. The package substrate 150 is arranged at the middle part of the shell 110 and abuts against the inner wall of the shell 110. The CZT probe 130 is connected to one side of the package substrate 150. An inner package cavity is formed by the other side of the package substrate 150 together with the inner wall of the shell 110. The processing module 170 is accommodated in the inner package cavity and connected to the package substrate 150. The shell 110 is connected to the fixed support 210, and the multi-channel analyzer 230 is connected to the processing module 170.

The fixed support 210 includes a base 211 and a carrying frame 213. The carrying frame 213 is provided with a drug placement tray and an activity meter fixing rod. The drug placement tray is configured for placement of radiopharmaceuticals. The shell 110 is fixedly connected to the activity meter fixing rod, and the shell 110 is opposed to the drug placement tray at its end close to the CZT probe 130. The isolation box 250 is detachably connected to the base 211 and arranged to cover the carrying frame 213, so that both the radiopharmaceuticals and the shell 110 are accommodated and isolated in the isolation box 250.

In the present embodiment, a sliding groove is provided in the base 211, and both ends of the bottom of the isolation box 250 extend into the sliding groove and can slide along the sliding groove. Preferably, the base 211 is provided with two sliding grooves provided in parallel, the isolation box 250 is in the shape of a cuboid, and the bottoms of two opposite side plates of the isolation box 250 respectively extend into the two sliding grooves and can slide along the sliding grooves to drive the isolation box 250 to move in the direction of the sliding grooves. When it is necessary to perform a measurement test, the isolation box 250 is moved so that the isolation box 250 covers the carrying frame 213 to avoid outward diffusion of X/γ-rays over a wide range. When the test is completed, the isolation box 250 is moved and the carrying frame 213 is exposed for easy loading of drugs.

In the present embodiment, the isolation box 250 is made of lead, and the box body of the isolation box 250 has a thickness between 3 mm and 10 mm. This numerical range is not specifically limited in the present disclosure.

The above description is merely illustrative of preferred embodiments of the present disclosure and is not intended to limit the present disclosure. It will be understood by those skilled in the art that various modifications and variations may be made to the present disclosure. Any modifications, equivalent alternatives, improvements and so on made within the spirit and principle of the present disclosure are intended to be encompassed within the scope of protection of the present disclosure.

The present disclosure also discloses the following technical solutions.

A1. A CZT semiconductor activity meter includes a shell, a CZT probe, a package substrate, and a processing module, wherein the CZT probe is arranged at one end of the shell, the package substrate is arranged at a middle part of the shell and abuts against an inner wall of the shell, the CZT probe is connected to one side of the package substrate, an inner package cavity is formed by the other side of the package substrate together with the inner wall of the shell, and the processing module is accommodated in the inner package cavity and connected to the package substrate; the CZT probe includes a first slab crystal, a second slab crystal, and a guiding and connecting crystal, the first slab crystal is connected to one end of the package substrate and extends in a direction away from the package substrate, the second slab crystal is connected to the other end of the package substrate and extends in a direction away from the package substrate, the first slab crystal and the second slab crystal are arranged oppositely in parallel to each other and form a photon capturing cavity, the guiding and connecting crystal is arranged inside the photon capturing cavity and is attached to a surface of the package substrate, and the first slab crystal, the guiding and connecting crystal, and the second slab crystal are connected in sequence and form a U-shaped structure; the guiding and connecting crystal includes a CZT crystal layer, a metal layer, and a protective layer, the CZT crystal layer is deposited on the surface of the package substrate, the protective layer is deposited on a surface of a side of the CZT crystal layer away from the package substrate, the metal layer is arranged between the CZT crystal layer and the protective layer, a plurality of heat-dissipating through holes are provided in a sidewall of the CZT crystal layer, the plurality of heat-dissipating through holes are arranged close to the metal layer and the plurality of heat-dissipating through holes are arranged in parallel, and each of the heat-dissipating through holes extends through the CZT crystal layer.

A2. In the CZT semiconductor activity meter according to A1, an insulating film layer is arranged between the metal layer and the CZT crystal layer to insulate the metal layer and the CZT crystal layer from each other.

A3. In the CZT semiconductor activity meter according to A2, a metal in the metal layer includes gold and is implanted between the protective layer and the CZT crystal layer using a metal ion source implantation method.

A4. In the CZT semiconductor activity meter according to A1, the CZT crystal layer has a thickness of 0.5 to 10 mm.

A5. In the CZT semiconductor activity meter according to A1, the protective layer includes an aluminum oxide layer.

A6. In the CZT semiconductor activity meter according to A1, the CZT probe further includes a biasing device, and the biasing device is connected to the metal layer by means of a gold wire and is configured to supply a voltage to the metal layer.

A7. In the CZT semiconductor activity meter according to A1, first metal grids are laid on both opposite surfaces of the first slab crystal and the second slab crystal, and the first metal grids on both sides are electrically connected to the metal layer.

A8. In the CZT semiconductor activity meter according to A7, a first heat dissipation substrate is arranged on a side surface of the first slab crystal away from the second slab crystal, and a second heat dissipation substrate is arranged on a side surface of the second slab crystal away from the first slab crystal.

A9. In the CZT semiconductor activity meter according to A8, the first heat dissipation substrate and the second heat dissipation substrate each include a graphene layer.

A10. In the CZT semiconductor activity meter according to A1, the heat-dissipating through holes are provided in each of the peripheral sidewalls of the CZT crystal layer, and the plurality of heat-dissipating through holes are staggered and communicated with each other inside the CZT crystal layer.

A11. In the CZT semiconductor activity meter according to A10, the plurality of heat-dissipating through holes are all located on a heat dissipation plane parallel to the upper surface of the CZT crystal layer, and there is a distance of 0.8 mm between the heat dissipation plane and the upper surface of the CZT crystal layer.

A12. In the CZT semiconductor activity meter according to A1, the CZT probe further includes a third slab crystal and a fourth slab crystal, the third slab crystal and the fourth slab crystal are arranged oppositely on two sides of the guiding and connecting crystal, and the photon capturing cavity which is in the shape of a cuboid is formed by the first slab crystal, the second slab crystal, the third slab crystal, and the fourth slab crystal.

A13. In the CZT semiconductor activity meter according to A12, second metal grids are laid on both opposite surfaces of the third slab crystal and the fourth slab crystal, and the second metal grids are electrically connected to the metal layer.

A14. In the CZT semiconductor activity meter according to A2, the shell is arranged to cover the first slab crystal and the second slab crystal, and an end portion of the shell is recessed inward and forms an inwardly recessed end which extends into the photon capturing cavity and is arranged close to the guiding and connecting crystal, so that the end portion of the shell has a contour matching with (attaching to) the first slab crystal and the second slab crystal.

A15. In the CZT semiconductor activity meter according to A14, the shape of the end surface of the inwardly recessed end is consistent with the shape of the guiding and connecting crystal, and the end surface of the inwardly recessed end covers the upper side of the guiding and connecting crystal.

A16. In the CZT semiconductor activity meter according to A2, the shell is arranged to cover the photon capturing cavity, and an end portion of the shell is provided with a collection opening opposite to the guiding and connecting crystal.

A17. In the CZT semiconductor activity meter according to A16, an end cover is arranged on the collection opening, one end of the end cover is hinged to one side edge of the shell, and the other end of the end cover is detachably connected to the other side edge of the shell to selectively shield the collection opening.

A18. In the CZT semiconductor activity meter according to A17, a rotating shaft is arranged at one end of the end cover, a rotating lug is arranged at one side edge of the shell, and the rotating shaft is hinged to the rotating lug.

A19. In the CZT semiconductor activity meter according to A18, the end cover is provided with a buckling piece at its end away from the rotating shaft, the shell is provided with a clamping groove in its side edge away from the rotating lug, and the buckling piece matches with the clamping groove.

A20. In the CZT semiconductor activity meter according to A1, a plurality of coupling channels are provided in the middle part of the package substrate, each of the coupling channels extends through the package substrate, the CZT probe is coupled to one ends of the plurality of coupling channels, and the processing module is coupled to the other ends of the plurality of coupling channels.

A21. In the CZT semiconductor activity meter according to A20, the processing module includes a charge-sensitive amplifier and a back-end processing unit, wherein the charge-sensitive amplifier is coupled to the ends of the coupling channels away from the CZT probe and is configured to collect charges and generate an electrical signal, and the back-end processing unit is connected to the output terminal of the charge-sensitive amplifier.

A22. In the CZT semiconductor activity meter according to A21, the back-end processing unit includes a main amplifying circuit, an analysis circuit, and an ADC processing circuit, wherein the main amplifying circuit is connected to the output terminal of the charge-sensitive amplifier and configured to amplify the electrical signal, the analysis circuit is connected to the main amplifying circuit and configured to analyze the electrical signal and obtain energy of incident rays, and the ADC processing circuit is connected to the analysis circuit and configured to obtain incident ray intensity information based on the energy of incident rays.

A23. In the CZT semiconductor activity meter according to A22, the processing module further includes a comparison unit, calibration activity data is set in the comparison unit, and the comparison unit is connected to the ADC processing circuit and configured to acquire activity information based on the incident ray intensity information.

A24. In the CZT semiconductor activity meter according to A23, the shell is provided with a data interface, and the data interface extends into the shell and is connected to the comparison unit.

A25. In the CZT semiconductor activity meter according to A20, the package substrate includes a ceramic board or an epoxy resin board.

B26. An activity measuring device includes a fixed support, a multi-channel analyzer, and the CZT semiconductor activity meter according to any one of A1 to A25, wherein the shell of the CZT semiconductor activity meter is connected to the fixed support, and the multi-channel analyzer is connected to the processing module of the CZT semiconductor activity meter.

B27. In the activity measuring device according to B26, the fixed support includes a base and a carrying frame, the carrying frame is provided with a drug placement tray and an activity meter fixing rod, the drug placement tray is configured for placement of a radiopharmaceutical, the shell is fixedly connected to the activity meter fixing rod, and the shell is opposed to the drug placement tray at its end close to the CZT probe.

B28. In the activity measuring device according to B27, the activity measuring device further includes an isolation box, and the isolation box is detachably connected to the base and is arranged to cover the carrying frame so that both the radiopharmaceutical and the shell are accommodated in the isolation box to be isolated.

B29. In the activity measuring device according to B28, a sliding groove is provided in the base, and both ends of the bottom of the isolation box extend into the sliding groove and can slide along the sliding groove.

B30. In the activity measuring device according to B28, the isolation box is made of lead, and the box body of the isolation box has a thickness between 3 mm and 10 mm.

INDUSTRIAL APPLICABILITY

A CZT semiconductor activity meter and an activity measuring device according to the embodiments of the present disclosure detect X/γ-rays using a CZT probe, instead of an original ionization chamber for detection, so that the CZT semiconductor activity meter has a greatly reduced size and can be conveniently carried. Furthermore, the measurement with the CZT semiconductor activity meter is implemented by generating an electrical signal by directly using the interaction of X/γ-rays with CZT crystals, and the amplitude of the electrical signal is proportional to the energy of the incident rays, whereby information on the energy of X/γ-rays can be detected, and the type and activity of the nuclide can be determined based on the energy information, without manual switching control, which is very convenient. Moreover, the CZT semiconductor activity meter is operable at room temperature due to the characteristics of the CZT crystals. Furthermore, the energy of X/γ-rays can be collected maximally by arranging the semi-closed photon capturing cavity so as to improve the detection accuracy.

What is claimed is:

1. A CZT semiconductor activity meter, comprising a shell, a CZT probe, a package substrate and a processing module, wherein the CZT probe is arranged at one end of the shell, the package substrate is arranged at a middle part of the shell and abuts against an inner wall of the shell, the CZT probe is connected to one side of the package substrate, an inner package cavity is formed by the other side of the package substrate and the inner wall of the shell, and the processing module is accommodated in the inner package cavity and connected to the package substrate;

the CZT probe comprises a first slab crystal, a second slab crystal and a guiding and connecting crystal, wherein the first slab crystal is connected to one end of the package substrate and extends in a direction away from the package substrate, the second slab crystal is connected to the other end of the package substrate and extends in a direction away from the package substrate, the first slab crystal and the second slab crystal are arranged oppositely in parallel to each other and form a photon capturing cavity, the guiding and connecting crystal is arranged inside the photon capturing cavity and is attached to a surface of the package substrate, and the first slab crystal, the guiding and connecting crystal and the second slab crystal are connected in sequence and form a U-shaped structure; and the guiding and connecting crystal comprises a CZT crystal layer, a metal layer and a protective layer, wherein the CZT crystal layer is deposited on the surface of the package substrate, the protective layer is deposited on a surface of a side of the CZT crystal layer away from the package substrate, the metal layer is arranged between the CZT crystal layer and the protective layer, a plurality of heat-dissipating through holes are provided in a sidewall of the CZT crystal layer, wherein the plurality of heat-dissipating through holes are arranged close to the metal layer and the plurality of heat-dissipating through holes are arranged in parallel, and each of the heat-dissipating through holes extends through the CZT crystal layer.

2. The CZT semiconductor activity meter according to claim 1, wherein an insulating film layer is arranged between the metal layer and the CZT crystal layer, so as to insulate the metal layer and the CZT crystal layer from each other.

3. The CZT semiconductor activity meter according to claim 2, wherein the shell is arranged to cover the first slab crystal and the second slab crystal, and an end portion of the shell is recessed inward and forms an inwardly recessed end, wherein the inwardly recessed end extends into the photon capturing cavity and is arranged close to the guiding and connecting crystal, so that the end portion of the shell has a contour attaching to the first slab crystal and the second slab crystal.

4. The CZT semiconductor activity meter according to claim 2, wherein the shell is arranged to cover the photon capturing cavity, and an end portion of the shell is provided with a collection opening opposite to the guiding and connecting crystal.

5. The CZT semiconductor activity meter according to claim 4, wherein an end cover is arranged on the collection opening, wherein one end of the end cover is hinged to an edge of a side of the shell, and the other end of the end cover is detachably connected to an edge of the other side of the shell, so as to selectively shield the collection opening.

6. The CZT semiconductor activity meter according to claim 5, wherein a rotating shaft is arranged at one end of the end cover, a rotating lug is arranged on an edge of one side of the shell, and the rotating shaft is hinged to the rotating lug; and a buckling piece is provided at an end of the end cover away from the rotating shaft, a clamping groove is provided at an edge of a side of the shell away from the rotating lug, and the buckling piece is matched with the clamping groove.

7. The CZT semiconductor activity meter according to claim 2, wherein a metal in the metal layer comprises gold and is implanted between the protective layer and the CZT crystal layer by a metal ion source implantation method.

8. The CZT semiconductor activity meter according to claim 2, wherein first metal grids are laid on both opposite surfaces of the first slab crystal and the second slab crystal, and the first metal grids on both sides are electrically connected to the metal layer.

9. The CZT semiconductor activity meter according to claim 2, wherein the heat-dissipating through holes are provided in each of sidewalls of the CZT crystal layer, and the plurality of heat-dissipating through holes are staggered and communicated with each other inside the CZT crystal layer.

10. The CZT semiconductor activity meter according to claim 2, wherein the CZT probe further comprises a third slab crystal and a fourth slab crystal, wherein the third slab crystal and the fourth slab crystal are arranged oppositely on two sides of the guiding and connecting crystal, and a photon capturing cavity is formed by the first slab crystal, the second slab crystal, the third slab crystal and the fourth slab crystal, wherein the photon capturing cavity is in a shape of a cuboid.

11. The CZT semiconductor activity meter according to claim 1, wherein a metal in the metal layer comprises gold and is implanted between the protective layer and the CZT crystal layer by a metal ion source implantation method.

12. The CZT semiconductor activity meter according to claim 11, wherein the shell is arranged to cover the first slab crystal and the second slab crystal, and an end portion of the shell is recessed inward and forms an inwardly recessed end, wherein the inwardly recessed end extends into the photon capturing cavity and is arranged close to the guiding and connecting crystal, so that the end portion of the shell has a contour attaching to the first slab crystal and the second slab crystal.

13. The CZT semiconductor activity meter according to claim 1, wherein first metal grids are laid on both opposite surfaces of the first slab crystal and the second slab crystal, and the first metal grids on both sides are electrically connected to the metal layer.

14. The CZT semiconductor activity meter according to claim 1, wherein the heat-dissipating through holes are provided in each of sidewalls of the CZT crystal layer, and the plurality of heat-dissipating through holes are staggered and communicated with each other inside the CZT crystal layer.

15. The CZT semiconductor activity meter according to claim 1, wherein the CZT probe further comprises a third slab crystal and a fourth slab crystal, wherein the third slab crystal and the fourth slab crystal are arranged oppositely on two sides of the guiding and connecting crystal, and a photon capturing cavity is formed by the first slab crystal, the second slab crystal, the third slab crystal and the fourth slab crystal, wherein the photon capturing cavity is in a shape of a cuboid.

16. The CZT semiconductor activity meter according to claim 15, wherein second metal grids are laid on both opposite surfaces of the third slab crystal and the fourth slab crystal, wherein the second metal grids are electrically connected to the metal layer.

17. The CZT semiconductor activity meter according to claim 1, wherein the CZT probe further comprises a biasing device, wherein the biasing device is connected to the metal layer by a gold wire and configured to supply a voltage to the metal layer.

18. The CZT semiconductor activity meter according to claim 1, wherein a first heat dissipation substrate is arranged on a surface of a side of the first slab crystal away from the second slab crystal, a second heat dissipation substrate is arranged on a surface of a side of the second slab crystal away from the first slab crystal, wherein the first heat dissipation substrate and the second heat dissipation substrate each comprise a graphene layer.

19. The CZT semiconductor activity meter according to claim 1, wherein the processing module comprises a charge-sensitive amplifier, a back-end processing unit and a comparison unit, wherein the charge-sensitive amplifier is coupled to one end of a coupling channel away from the CZT probe and is configured to collect charges and generate an electrical signal; the back-end processing unit is connected to an output terminal of the charge-sensitive amplifier and configured to process the electrical signal output from the charge-sensitive amplifier, so as to obtain incident ray intensity information; and the comparison unit is connected to an output terminal of the back-end processing unit and configured to acquire activity information based on the incident ray intensity information output from the back-end processing unit.

20. An activity measuring device, comprising a fixed support, a multi-channel analyzer and the CZT semiconductor activity meter according to claim 1, wherein the shell of the CZT semiconductor activity meter is connected to the fixed support, and the multi-channel analyzer is connected to the processing module of the CZT semiconductor activity meter.

* * * * *